US011955682B2

(12) United States Patent
Liu et al.

(10) Patent No.: US 11,955,682 B2
(45) Date of Patent: Apr. 9, 2024

(54) CWG FILTER, AND RU, AU OR BS HAVING THE SAME

(71) Applicant: Telefonaktiebolaget LM Ericsson (publ), Stockholm (SE)

(72) Inventors: Yongbin Liu, Beijing (CN); Jianlan Li, Beijing (CN); Mengyang Jia, Beijing (CN); Ying Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 121 days.

(21) Appl. No.: 17/789,416

(22) PCT Filed: Dec. 30, 2020

(86) PCT No.: PCT/CN2020/141458
§ 371 (c)(1),
(2) Date: Jun. 27, 2022

(87) PCT Pub. No.: WO2021/136389
PCT Pub. Date: Jul. 8, 2021

(65) Prior Publication Data

US 2023/0067193 A1 Mar. 2, 2023

(30) Foreign Application Priority Data

Dec. 31, 2019 (WO) ................ PCT/CN2019/130526

(51) Int. Cl.
*H01P 1/208* (2006.01)
*H01P 1/20* (2006.01)
(Continued)

(52) U.S. Cl.
CPC ............ *H01P 1/212* (2013.01); *H01P 1/2002* (2013.01); *H01P 1/2088* (2013.01); *H01P 5/04* (2013.01)

(58) Field of Classification Search
CPC ...... H01P 1/2002; H01P 1/2088; H01P 1/202; H01P 1/2053; H01P 1/2056; H01P 1/20;
(Continued)

(56) References Cited

U.S. PATENT DOCUMENTS 5,831,497 A * 11/1998 Yorita .................. H01P 1/2056 333/202
11,271,277 B2 * 3/2022 Zhang ....................... H01P 3/16
(Continued)

FOREIGN PATENT DOCUMENTS

CN 208622916 U 3/2019
CN 110098456 A 8/2019
CN 110137638 A 8/2019

OTHER PUBLICATIONS

Cao, Liangzu, et al., "Tuning Properties of Dielectric Ceramic Filters", Journal of Ceramics, vol. 38, No. 6, Dec. 1-5, 2017.
(Continued)

*Primary Examiner* — Stephen E. Jones
(74) *Attorney, Agent, or Firm* — Murphy, Bilak & Homiller, PLLC

(57) ABSTRACT

A ceramic waveguide filter, a radio unit, an antenna unit and a base station are disclosed. According to an embodiment, a ceramic waveguide filter comprises a body (1) that is made of a ceramic material and that has a plurality of resonators each including a blind hole (101). The blind holes (101) of two of the resonators open at a first surface of the body (1) and extend toward an opposite second surface of the body (1). Capacitive coupling between the two resonators is achieved by a coupling structure (201) on/in a substrate (2), to which the body (1) is attached at the side of the second surface.

20 Claims, 5 Drawing Sheets

(51) Int. Cl.
*H01P 1/212* (2006.01)
*H01P 5/04* (2006.01)

(58) Field of Classification Search
CPC .......... H01P 1/201; H01P 1/207; H01P 1/208; H01P 1/205; H01P 1/2084; H01P 3/16; H01P 3/122; H01P 3/121; H01P 7/10; H01P 7/105
See application file for complete search history.

(56) References Cited

U.S. PATENT DOCUMENTS

| | | | | |
|---|---|---|---|---|
| 11,437,691 | B2 * | 9/2022 | Jing | H01P 3/16 |
| 2003/0090344 | A1 | 5/2003 | Wang et al. | |
| 2010/0001815 | A1 | 1/2010 | Ermutlu et al. | |
| 2015/0207193 | A1 | 7/2015 | Cuadras et al. | |
| 2016/0094265 | A1 * | 3/2016 | Yuan | H01P 1/213 333/202 |
| 2022/0359966 | A1 * | 11/2022 | Jian | H01P 5/087 |

OTHER PUBLICATIONS

"3-Dimensional Circuitry Laser Direct Structuring Technology (LPKF-LDS) for Moulded Interconnect Devices", LPKF Laser & Electronics, XP055257222, Nov. 21, 2014, 12 pages.

* cited by examiner

CWG FILTER, AND RU, AU OR BS HAVING THE SAME

TECHNICAL FIELD

The present disclosure generally relates to components of communication device, and more particularly, to a ceramic waveguide (CWG) filter, a radio unit (RU) or an antenna unit (AU) having the CWG filter, and a base station (BS) having the RU and/or the AU.

BACKGROUND

This section introduces aspects that may facilitate better understanding of the present disclosure. Accordingly, the statements of this section are to be read in this light and are not to be understood as admissions about what is in the prior art or what is not in the prior art.

BS is an important part of mobile communication system, and may include an RU and an AU. Considering the installation\fixation\occupation, smaller volume and lighter weight is always an important evolution direction in BS design, including legacy base station, street macro, micro, small cell and advanced antenna system (AAS).

With the development of 5th Generation (5G) communication, Multiple-Input and Multiple-Output (MIMO) technology is widely used in Sub-6 GHz base station product, in which a large amount of Filter Units (FUs) need to be integrated/embedded with AU or RU. Considering cost and space saving, FUs are usually soldered onto radio mother board, low pass filter (LPF) board, antenna calibration board or antenna power splitter board, which means smaller and lighter FUs are quite in demand.

In traditional BS solution, metal cavity FU is most recommended because of its high quality factor (Q) value and power handling performance. For 5G advanced radio system, power handling requirement becomes less critical, while the size and weight of FU becomes hot issues. CWG filter is one of most preferred 5G FU solutions, due to its competitive Q value, light weight, small size and low cost.

CWG filter body is formed from solid dielectric material such as ceramic coated with conducting material, e.g. silver. Ceramic property of high permittivity reduces the guide wavelength, which makes CWG filter have a smaller physical size than conventional cavity filter for a specific resonant frequency. And dielectric cavities/resonators in the body are associated by direct-coupling or cross-coupling structure. In the filter topology, both inductive, also called positive coupling and capacitive, also called negative coupling are often used to realize resonator coupling. The negative/capacitive coupling is especially important to realized cross-coupling.

At present, most CWG filter realize negative/capacitive coupling by deep blind hole or blind groove on the ceramic body, which is not convenient in coupling value/strength control and not flexible in coupling position settings, and which also increases cost and decreases near band attenuation performance due to harmonic spur.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for introducing a capacitive cross-coupling in a CWG filter.

According to a first aspect of the disclosure, there is provided a CWG filter. The CWG filter comprises a body that is made of ceramic and has a plurality of resonators each including a blind hole. The blind holes of two of the resonators open at a first surface of the body and extend toward an opposite second surface of the body. Capacitive coupling between the two resonators is achieved by a coupling structure on/in a substrate, to which the body is attached at the side of the second surface.

In an embodiment of the disclosure, a metalized groove is provided on the second surface of the body at respective positions that correspond to the two resonators, to which the coupling structure is connected via a soldering pad.

In an embodiment of the disclosure, a metal pin is provided on the second surface of the body at respective positions that correspond to the two resonators, by means of which the coupling structure is connected to the body.

In an embodiment of the disclosure, a soldering pad is provided on the second surface of the body at respective positions that correspond to the two resonators, by means of which the coupling structure is connected to the body.

In an embodiment of the disclosure, the substrate is also a part of the CWG filter, the substrate can be a printed circuit board (PCB) or a plastic board on which the coupling structure is formed.

According to a second aspect of the disclosure, there is provided a radio unit, comprising a CWG filter according to the first aspect and the substrate to which the body of the CWG filter is attached.

In an embodiment of the disclosure, the substrate is a radio mother board or a LPF board.

In an embodiment of the disclosure, the coupling structure is a transmission line, a parallel coupler, an interdigital coupler, or a broadside strip line coupler on/in the substrate.

In an embodiment of the disclosure, the substrate is made of plastic, and the coupling structure is a metal layer that is integrally formed on the substrate by plating on plastic (POP).

According to a third aspect of the disclosure, there is provided an antenna unit, comprising a CWG filter according to the first aspect and the substrate to which the body of the CWG filter is attached.

In an embodiment of the disclosure, the substrate is an antenna calibration board or an antenna power splitter board.

In an embodiment of the disclosure, the coupling structure is a transmission line, a parallel coupler, an interdigital coupler, or a broadside strip line coupler on/in the substrate.

In an embodiment of the disclosure, the substrate is made of plastic, and the coupling structure is a metal layer that is integrally formed on the substrate by POP.

According to a fourth aspect of the disclosure, there is provided a base station, comprising a radio unit according to the second aspect and/or an antenna unit according to the third aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
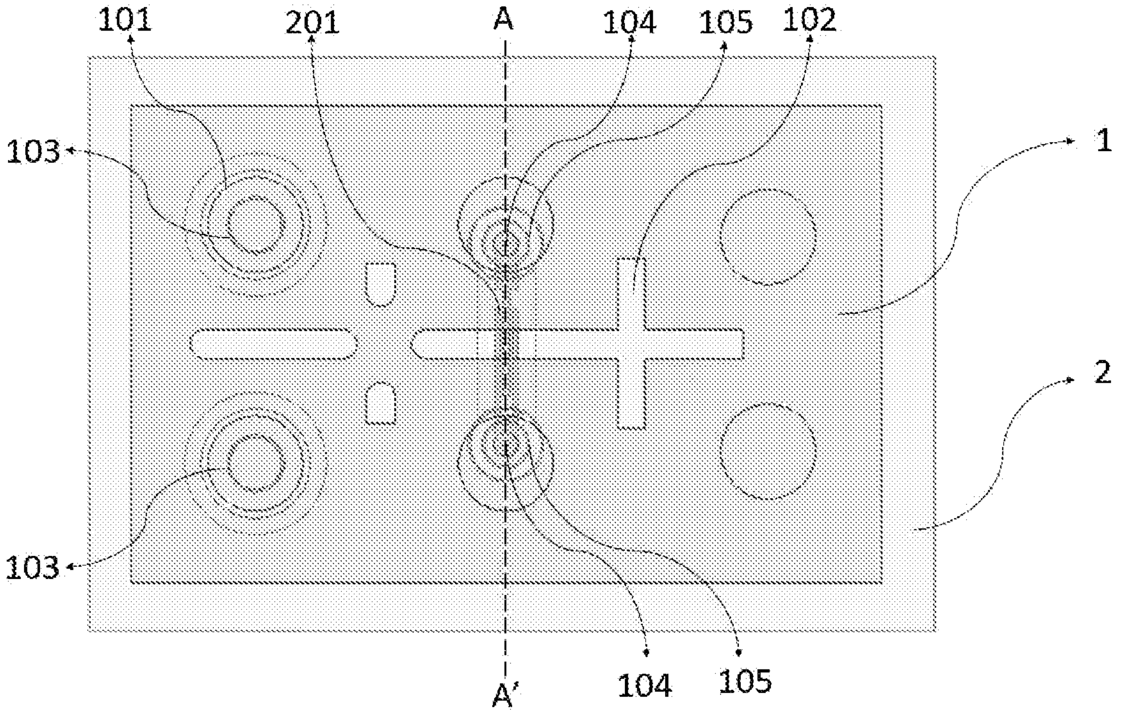
FIG. 1 shows a CWG filter according to an embodiment of the disclosure when viewed from above, together with a substrate to which a body of the CWG filter is attached.
Figure 2:
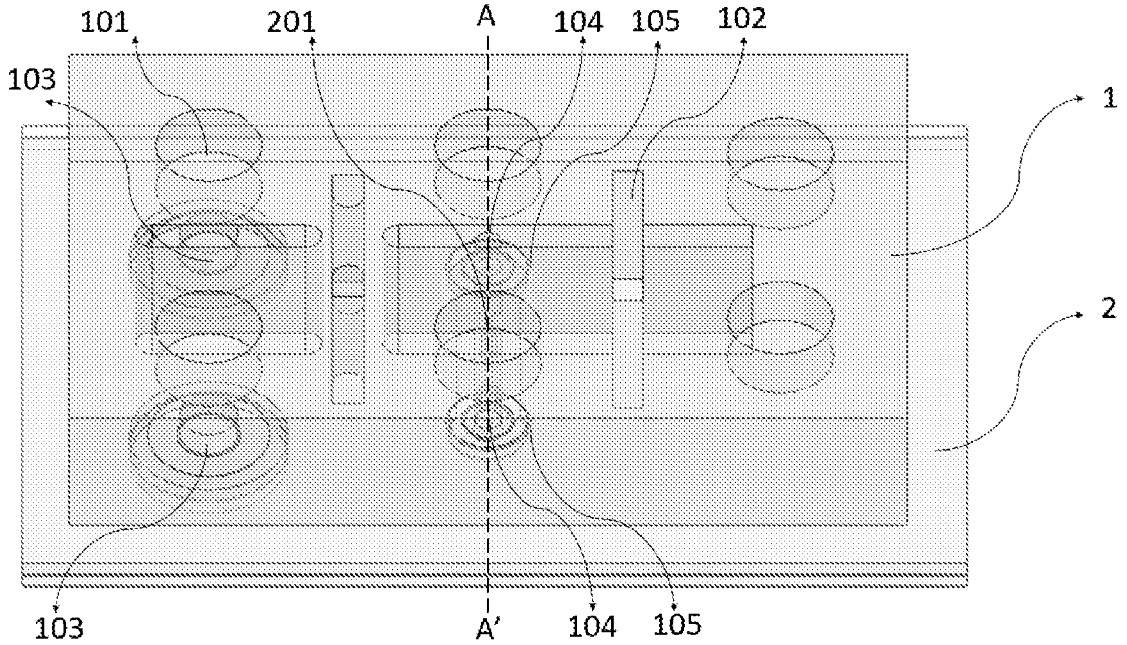
FIG. 2 shows the CWG filter tilted toward a top side from FIG. 1.
Figure 3:
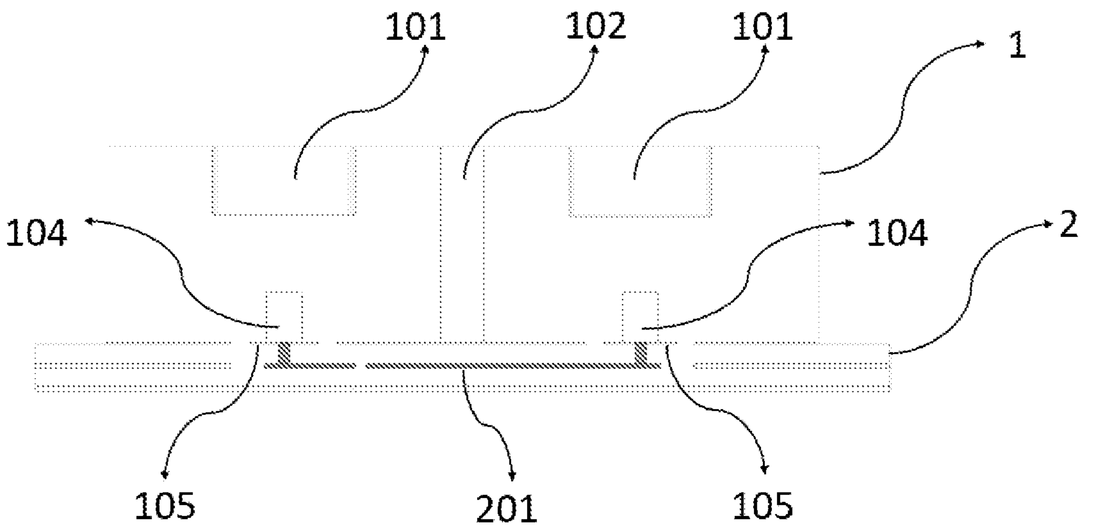
FIG. 3 is a sectional view of the CWG filter taken along a line A-A' shown in FIG. 1 and FIG. 2.

FIG. 1 shows a CWG filter according to an embodiment of the disclosure when viewed from a top side of the CWG filter. FIG. 2 is a view tilted toward the top side from FIG. 1. It should be noted that in FIG. 1 and FIG. 2, some parts which in fact are not visible are also shown to illustrate relative positions thereof with respect to other parts. FIG. 3 is a sectional view of the CWG filter taken along a line A-A' shown in FIG. 1 and FIG. 2.

The CWG filter according to the embodiment includes a body 1 made of a ceramic material. The surfaces of the body 1 are covered with a conducting layer. The conducting layer may be a metalized layer that is formed by, for example, electroplating metal on the surfaces of the body 1. The metal may be silver, or may be another metal that satisfies a specific requirement.

In the illustrated embodiment, the body 1 has six, i.e. first to sixth resonators or resonating cavities. Each resonator include a blind hole 101. Although the blind hole 101 is shown to have a circular cross section, the present disclosure is not limited to this. For example, the blind hole 101 may be in a shape of a rectangle, an ellipse, or any other shapes in the cross section. As will be appreciated by those skilled in the art, each blind hole 101 can be used to tune a resonating frequency of a corresponding resonator.

In the illustrated embodiment, six blind holes 101 are all disposed on the top surface of the body 1. In other words, each of the blind holes 101 opens at the top surface of the body 1 and extends toward the bottom surface of the body 1. In another embodiment, some of the blind holes 101 may open at the bottom surface of the body 1 and extend toward the top surface of the body 1. The blind holes 101 may have same or different depth, i.e. dimension in the extending direction of the blind hole. The depth of each blind hole 101 can be set according to a specific application scenario, so as to obtain a desired resonance frequency.

Further, the blind hole 101 is provided with a conducting layer which, for example, is formed by electroplating metal on the bottom surface and the wall surface of the blind hole 101. The resonance frequency of each resonator may be tuned, for example, by removing a part of the conducting layer that covers the bottom surface and/or the wall surface of the respective blind hole 101.

At the central portion of the body 1, there is provided a number of through channels 102 that penetrates through the body 1 from the top surface to the bottom surface thereof. The through channels 102 serve as isolation walls between two adjacent resonators, which help to tune the coupling value between the two adjacent resonators. The through channels 102 may take any appropriate shape in a cross section of the body 1. For example, as shown in FIG. 1 a bar-shaped channel is provided between the first resonator and the sixth resonator, and a cross-shaped channel is provided to isolate the second to fifth resonators.

In another embodiment, two adjacent resonators may be coupled to each other by a through groove, which penetrates through the body 1 from the top surface to the bottom surface thereof.

The body 1 is provided with a pair of input and output ports 103 on the bottom surface of the body 1. Signals may be input via the input port, and may be output via the output port. The position of the pair of input and output ports 103 corresponds to the position of two of the resonators. In the illustrated embodiment, the input and output ports 103 are located below the first and sixth blind holes 101. In another embodiment, the input and output ports 103 may be located below other blind holes 101. In a further embodiment, the input and output ports 103 may be disposed on a side surface of the body 1.

In use, the CWG filter is normally arranged on and supported by a substrate 2. The substrate 2 may be a PCB. In one embodiment, the CWG filter is integrated/embedded with a radio unit, and the substrate 2 may be a radio mother board or an LPF board of the radio unit. In another embodiment, the CWG filter is integrated/embedded with an antenna unit, and the substrate 2 may be an antenna calibration board or a power splitter board of the antenna unit.

In the illustrated embodiment, the substrate 2 is placed below the body 1 of the CWG filter, and the body 1 is attached to the substrate 2 at the bottom side of the body 1. For example, the body 1 may be soldered onto the substrate 2 by a soldering pad, and the body 1 and the substrate 2 are common-grounded.

According to the present disclosure, the substrate 2 is provided with a coupling structure 201, as can be clearly seen from FIG. 3. The coupling structure 201 serves to produce capacitive coupling between two of the resonators of the body 1, for example, the second and fifth resonators as shown in FIG. 1 and FIG. 2.

Figure 4:
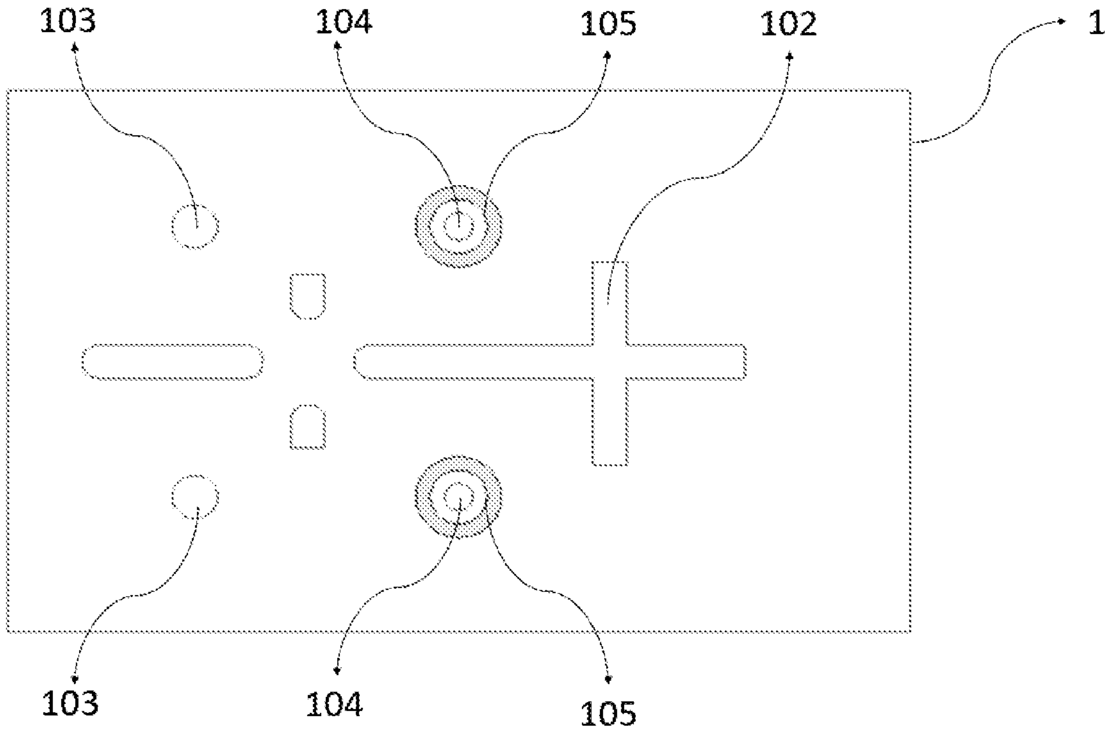
FIG. 4 is a bottom view of the body of the CWG filter according to the embodiment.

To achieve the capacitive coupling, each of the second and fifth resonators in FIG. 1 and FIG. 2 is provided with a metalized groove 104 on the bottom surface of the body 1, as can be clearly seen from FIG. 4 which is a bottom view of the body 1. The metalized groove 104 is located below the corresponding blind hole 101, and has a diameter smaller than that of the blind hole 101. The coupling structure 201 has two connection portions, each of which is connected to the metalized groove 104 via a soldering pad 105.

As shown in FIG. 1, the center of the metalized groove 104 does not necessarily coincide with the center of the corresponding blind hole 101. The capacitive coupling value can be controlled or optimized by changing the position of the metalized groove 104, or in other words, the connection point of the coupling structure 201 to the body 1. In addition, the capacitive coupling value can be optimized by changing the length and/or the width of the coupling structure 201.

In another embodiment, each of the second and fifth resonators in FIG. 1 and FIG. 2 may be provided with a metal pin on the bottom surface of the body 1. The metal pin may be located below the corresponding blind hole 101, and may have a diameter smaller than that of the blind hole 101. Two connection portions of the coupling structure 201 may be connected to the metal pin.

In another embodiment, each of the second and fifth resonators in FIG. 1 and FIG. 2 may be provided with a soldering pad on the bottom surface of the body 1, which is connected to the substrate for example via a soldering pad on the substrate. The soldering pad on the bottom surface of the body 1 may be located below the corresponding blind hole 101. In other words, the metalized grooves 104 shown in FIG. 1 to FIG. 4 are omitted in this embodiment.

In a further embodiment, the capacitive coupling may be produced between two resonators other than the second and fifth resonators shown in FIG. 1 and FIG. 2.

Figure 5:
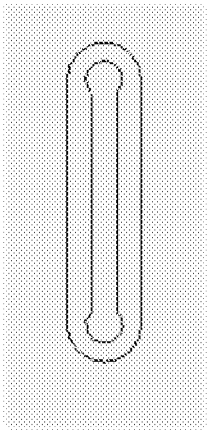
FIG. 5 is a schematic diagram illustrating a first example of a coupling structure on the substrate.
Figure 6:
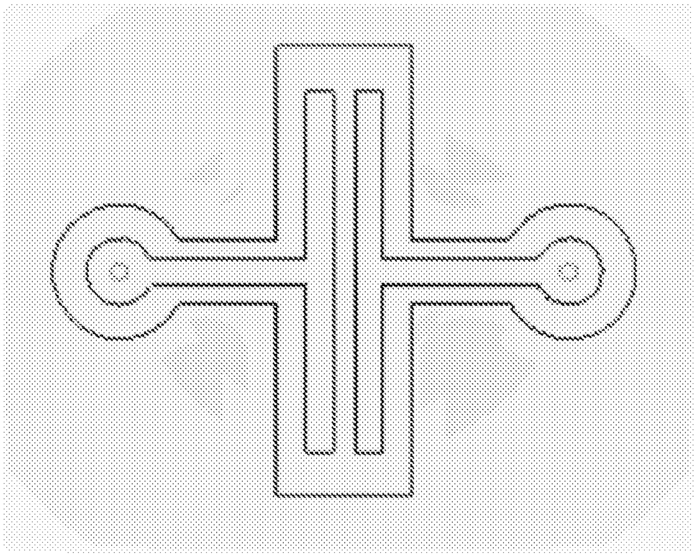
FIG. 6 is a schematic diagram illustrating a second example of the coupling structure.
Figure 7:
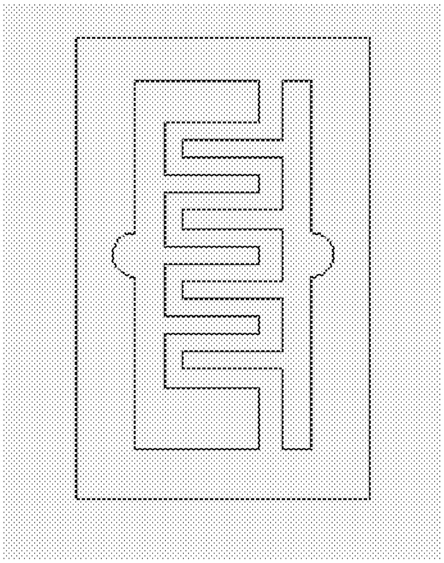
FIG. 7 is a schematic diagram illustrating a third example of the coupling structure.
Figure 8:
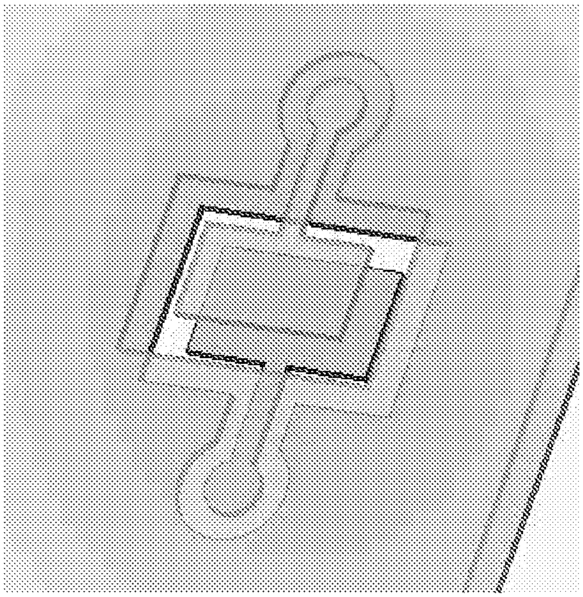
FIG. 8 is a schematic diagram illustrating a fourth example of the coupling structure.

The coupling structure 201 may be embodied in various configurations. For example, the coupling structure 201 can be realized by a transmission line as shown in FIG. 5, a parallel coupler as shown in FIG. 6, an interdigital coupler as shown in FIG. 7, or a broadside strip line coupler as shown in FIG. 8. The configuration of the transmission line, the parallel coupler, the interdigital coupler and the broadside strip line coupler are well-known to those skilled in the art, so the relevant description is omitted.

Figure 9:
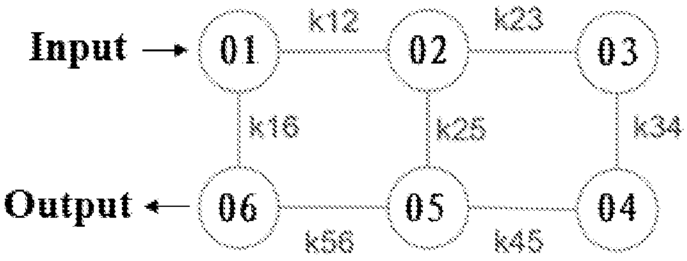
FIG. 9 is a schematic diagram illustrating a topology of the CWG filter according to the embodiment.

FIG. 9 is a schematic diagram illustrating a topology of the CWG filter shown in FIG. 1. The sequence numbers 01, 02, 03, 04, 05 and 06 in a circle correspond to the first to sixth resonators of the CWG filter, respectively.

Direct-coupling k12 is provided between the first resonator 01 and the second resonator 02. Direct-coupling k23 is provided between the second resonator 02 and the third resonator 03. Direct-coupling k34 is provided between the third resonator 03 and the fourth resonator 04. Direct-coupling k45 is provided between the fourth resonator 04 and the fifth resonator 05. Direct-coupling k56 is provided between the fifth resonator 05 and the sixth resonator 06. Cross-coupling k16 is provided between the first resonator 01 and the sixth resonator 06. The direct-couplings k12, k23, k34, k45, k56 and the cross-coupling k16 are positive/inductive couplings that may be provided by electrically conductive through channels, grooves, apertures and/or holes, as well-known to those skilled in the art.

A cross-coupling k25 is provided between the second resonator 02 and the fifth resonator 05. The cross-coupling K25 is a capacitive/negative coupling provided by the coupling structure 201 on/in the substrate 2. The capacitive coupling value of the cross-coupling K25 can be optimized as mentioned above.

Figure 10:
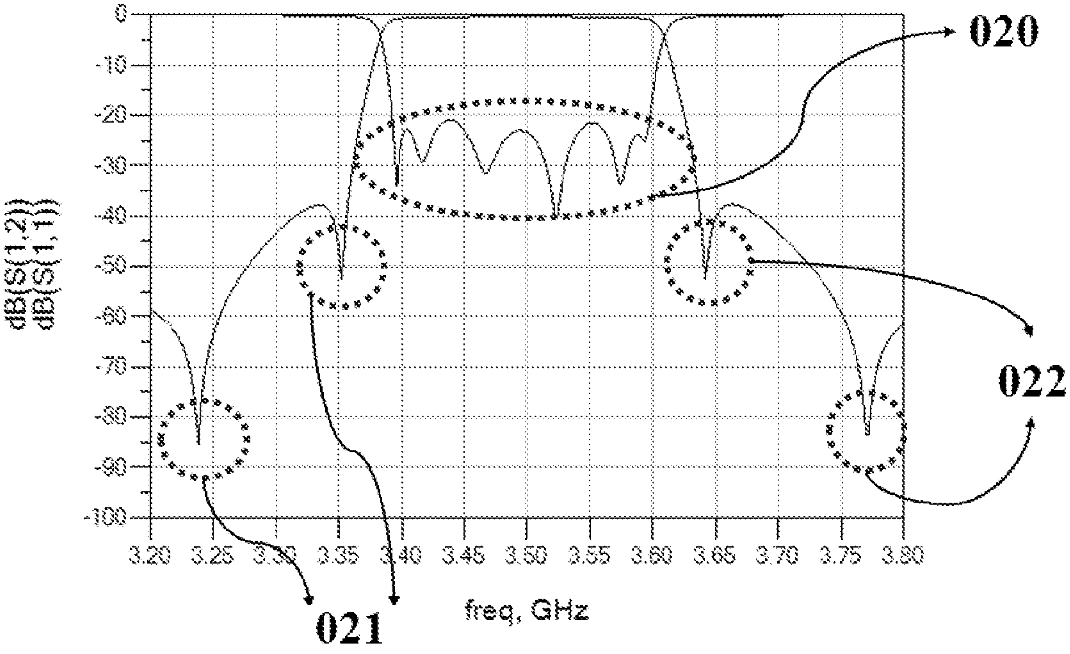
FIG. 10 is a schematic diagram illustrating a frequency response curve of the CWG filter according to the embodiment.

FIG. 10 is a schematic diagram illustrating a frequency response curve of the six-pole CWG filter shown in FIG. 1. As shown in FIG. 10, the CWG filter has a pass band indicated by 020. A pair of transmission zeroes 021 are produced on the low side of the pass band 020. Another pair of transmission zeroes 022 are produced on the high side of the pass band 020. The frequency point position of the transmission zeroes 021, 022 can be tuned by optimizing the cross-coupling value.

In the above-mentioned embodiments, the CWG filter has six resonators and thus six poles. It will be readily appreciated by those skilled in the art that the number of the resonators or poles is not limited to six, and the CWG filter according to other embodiments of the present disclosure may have a topology different from that shown in FIG. 9. Moreover, any of the resonators may include two or more blind holes.

In the above-mentioned embodiments, the substrate 2 is a PCB. The coupling structure 201 can be designed on the surface of the PCB, or it is designed on inner layer(s) of the PCB. For example, a broadside strip line coupler as shown in FIG. 8 is designed on a surface layer and an inner layer of the substrate. What's more, the disclosure is not limited to PCB. For example, the substrate 2 may be a board made of plastic, and the coupling structure 201 may be a metal layer that is integrally formed on the substrate 2 by POP.

Based on the above-mentioned embodiments, the CWG filter may include both the ceramic body and the substrate in/on which the coupling structure is formed. The CWG filter can not only embedded on a radio unit or an antenna unit of a base station, but other electric devices where CWG filter can be used.

In the above-mentioned embodiments, the body 1 of the CWG filter is formed by a bulk of ceramic material. However, the disclosure is not limited to this. For example, the body 1 of the CWG filter may include two ceramic blocks that are stacked one above another.

Advantages of the CWG filter according to embodiments of the disclosure will be described below.

Filter optimization target is always to realize in-band and out-of-band performance under minimum filter order or the number of filter poles. The number of filter resonators decides, and actually is equal to the number of poles. Under same filter order, the number and the strength of filter transmission zeros, which are produced by cross-coupling, have great influence on filter out-of-band attenuation performance.

Capacitive coupling is harder to implement and control in CWG filter than traditional metal cavity filter due to its small size and solid ceramic block structure. Existing CWG filters make use of deep blind hole or groove to inverse field to realize capacitive coupling, which is not very convenient in coupling value/strength control and not flexible in coupling position settings, and which also increases cost and decreases near band attenuation performance due to harmonic spur.

In contrast, according to embodiments of the present disclosure, capacitive coupling is realized by a coupling structure 201 on a substrate 2 to which the body 1 of the CWG filter is attached. The coupling structure 201 couples the electric filed energy of one resonator of the CWG filter to the electric filed energy of another resonator, and thus realizes capacitive coupling between the two resonators.

According to embodiments of the present disclosure, the capacitive coupling value/strength can be controlled or optimized by changing the length, the width, the shape and/or the position of the coupling structure 201. It is easier to route or shape the coupling structure 201 on/in the substrate 2. Thus, compared with the existing deep blind hole/groove solution, capacitive coupling can be realized much more flexibly, and it is more effective to make filter topology. Moreover, the accuracy of the capacitive coupling value is much better than the existing blind hole/groove solution, which makes the CWG filter have a better production consistency.

Furthermore, the CWG filter according to embodiments of the present disclosure can not only realize better out-of-band attenuation performance, but also benefit near band harmonic spur and in-band insertion loss.

In preferred embodiments of the present disclosure, the substrate 2 on which the coupling structure 201 is provided is a radio mother board or an LPF board of a radio unit, or an antenna calibration board or a power splitter board of the antenna unit, which depends on floorplan of base station product. By re-using such an originally existed PCB to achieve the capacitive coupling, no more extra cost is caused.

The present disclosure also relates to a radio unit or an antenna unit comprising a CWG filter described hereinabove, and a base station comprising the radio unit and/or the antenna unit.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A ceramic waveguide filter, comprising a body that is made of ceramic and has a plurality of resonators each including a blind hole, the blind holes of two of the resonators opening at a first surface of the body and extending toward an opposite second surface of the body, and wherein capacitive coupling between the two resonators is achieved by a coupling structure on/in a substrate to which the body is attached at the side of the second surface.

2. The ceramic waveguide filter according to claim 1, wherein a metalized groove is provided on the second surface of the body at respective positions that correspond to the two resonators, to which the coupling structure is connected via a soldering pad.

3. The ceramic waveguide filter according to claim 1, wherein a metal pin is provided on the second surface of the body at respective positions that correspond to the two resonators, by means of which the coupling structure is connected to the body.

4. The ceramic waveguide filter according to claim 1, wherein a soldering pad is provided on the second surface of the body at respective positions that correspond to the two resonators, to which the coupling structure is connected.

5. The ceramic waveguide filter according to claim 1, wherein the ceramic waveguide filter further comprises the substrate, wherein the substrate is a printed circuit board or made of plastic on which the coupling structure is formed.

6. A radio unit, comprising a ceramic waveguide filter according to claim 1, and the substrate to which the body of the ceramic waveguide filter is attached.

7. The radio unit according to claim 6, wherein the substrate is a radio mother board or a low pass filter board.

8. The radio unit according to claim 6, wherein the coupling structure is a transmission line, a parallel coupler, an interdigital coupler, or a broadside strip line coupler on/in the substrate.

9. The radio unit according to claim 6, wherein the substrate is made of plastic, and the coupling structure is a metal layer that is integrally formed on the substrate by plating on plastic.

10. A base station comprising a radio unit according to claim 6.

11. The base station according to claim 10, wherein a metalized groove is provided on the second surface of the body at respective positions that correspond to the two resonators, to which the coupling structure is connected via a soldering pad.

12. The base station according to claim 10, wherein a metal pin is provided on the second surface of the body at respective positions that correspond to the two resonators, by means of which the coupling structure is connected to the body.

13. The base station according to claim 10, wherein a soldering pad is provided on the second surface of the body at respective positions that correspond to the two resonators, to which the coupling structure is connected.

14. An antenna unit, comprising a ceramic waveguide filter according to claim 1, and the substrate to which the body of the ceramic waveguide filter is attached.

15. The antenna unit according to claim 14, wherein the substrate is an antenna calibration board or an antenna power splitter board.

16. The antenna unit according to claim 14, wherein the coupling structure is a transmission line, a parallel coupler, an interdigital coupler, or a broadside strip line coupler on/in the substrate.

17. The antenna unit according to claim 14, wherein the substrate is made of plastic, and the coupling structure is a metal layer that is integrally formed on the substrate by plating on plastic.

18. The antenna unit according to claim 14, wherein a metalized groove is provided on the second surface of the body at respective positions that correspond to the two resonators, to which the coupling structure is connected via a soldering pad.

19. The antenna unit according to claim 14, wherein a metal pin is provided on the second surface of the body at respective positions that correspond to the two resonators, by means of which the coupling structure is connected to the body.

20. The antenna unit according to claim 14, wherein a soldering pad is provided on the second surface of the body at respective positions that correspond to the two resonators, to which the coupling structure is connected.

* * * * *